UNITED STATES PATENT OFFICE 2,257,201

RESINS AND PROCESS OF MAKING THE SAME

Warren M. Smith, Elizabeth, and William J. Sparks, Cranford, N. J., assignors to Standard Oil Development Company, a corporation of Delaware No Drawing. Application October 6, 1937, Serial No. 167,531

9 Claims. (Cl. 260—2)

This invention relates to improved synthetic resinous materials. It particularly relates to resinous materials which are secured by reacting a substituted propene compound with an aromatic material and especially to the resins prepared by reacting an alkyl or aryl halo propene compound with benzene in the presence of a catalyst of the type of aluminum chloride.

The invention is concerned with resinous materials prepared by condensing an alkyl or aryl-2-substituted-3-halo-propene compound with an aromatic material according to the following reaction:

Reaction

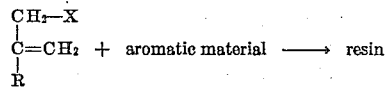

in which X is a halogen and R represents an alkyl or aryl group.

Preferred resins are secured by reacting an alkyl substituted halo propene compound as, for example, 2-methyl-3-chlor-propene, with an aromatic material such as benzene. Other alkyl or aryl halo propenes, such as 2-ethyl-3-chlor propene, 2-propyl 3-chlor-propene, 2-ethyl-3-brom-propene and 2-phenyl-3-chlor-propene, are also satisfactory. The preferred alkyl halo propenes, for instance, are the chlorides having from 1 to 6 carbon atoms in the alkyl group as, for example, 2-methyl-3-chlor-propene, 2-ethyl-3-chlor-propene and 2-amyl-3-chlor-propene. Preferred aryl halo propenes are 2-phenyl-3-chlor-propene and 2-naphthyl-3-chlor-propene.

The aryl groups of the aryl halo propenes may contain alkyl, amino or hydroxyl groups. These aryl or alkyl halo propenes are reacted with aromatic materials such as benzene, naphthalene and substituted products as, for example, those aromatic materials containing alkyl, amino or hydroxyl groups. A mixture of these aromatic compounds or their derivatives may also be employed. It is also within the scope of this invention to react aromatic materials of the type derived from coal tar or of the type secured by the destructive hydrogenation of a petroleum oil.

The reaction of the alkyl or aryl halo propene with the aromatic material is conducted in the presence of catalyst of the type of aluminum chloride or boron fluoride, preferably at elevated temperatures and at atmospheric pressure. The temperature and pressure conditions are regulated in order that the products react and condense with the evolution of hydrogen chloride, resulting in the formation of a resinous material.

The alkyl or aryl halo propene may be secured in any particular manner. One method of securing these products is to halogenate tertiary olefines as, for example, gamma butylene or methyl ethyl ethylene, under conditions where the halogen replaces a hydrogen of the saturated carbon atom with the evolution of hydrogen halide and does not effect the double bond. This reaction is best conducted by having an intimate uniform mixing of the halogen in the olefine which is best secured by injecting the halogen by means of atomizing jets. The rate of flow of the halogen and the olefin is so regulated and controlled that there exists at no time an excess of the halogen. Cooling means are employed and the reaction products are removed immediately in order to prevent secondary reactions which decreases the yield of the alkyl or aryl halo propene.

For example, one method of making an alkyl halo propene is to treat isobutylene or a mixture containing isobutylene, preferably in the liquid state, with a stream of chlorine at a rate at which one mol of isobutylene is mixed with two-thirds of a mol of chlorine. These streams are intimately mixed and kept in contact for approximately one second. In no case should the time of contact be above five seconds. The temperature of the reaction is maintained preferably below 212° F. and overheating is prevented by means of external cooling elements or by means of evaporating an internal cooling agent. It is preferable to have instant removal of the heat of reaction at a uniform rate throughout the mixture. This reaction mixture is then led into the bottom of a scrubbing tower in which the reaction mixture is scrubbed with countercurrently flowing water. The water acts as a solvent in regard to the hydrogen chloride, thereby preventing secondary reactions, and also acts as a cooling medium and condenses the 2-methyl-3-chlor-propene produced. The water containing the hydrogen chloride and condensed 2-methyl-3-chlor-propene is then withdrawn from the scrubbing tower and led into a settling tank in which the 2-methyl-3-chlor-propene and the water containing the hydrogen chloride stratify. The 2-methyl-3-chlor-propene is then withdrawn and may be further purified, if desired. Aryl halo propenes may be prepared in a similar manner by substituting a compound as, for example 2-phenyl propylene or 2-naphthyl propylene for the beta butylene employed in the process described.

The aryl or alkyl halo propenes are reacted with aromatic materials in the presence of catalyst of the type of aluminum chloride or boron fluoride under conditions that resinous material is formed and a hydrogen halide is evolved. The mixture is heated, preferably at around atmospheric pressure and at a temperature at which the aromatic material will be refluxed, until a resinous product is secured. Resins prepared in this manner are washed with water and may be further purified or oxidized in order to modify them.

The following example is given as an illustration of one method of preparing these resins: A mixture consisting of 5 parts by weight of benzene and 5 parts of 2-methyl-3-chlor-propene and 1 part of aluminum chloride was heated on a hot plate at a temperature of about 176° F. for several minutes. A resinous brown colored product was formed and hydrogen chloride was evolved. The resinous product was separated from the benzene by distilling off the benzene and was then boiled with water, which completely removes the benzene and hydrogen chloride. Chloroform was then added which dissolved the resin and the solution decanted off. The resin was precipitated by adding ethyl alcohol and the liquid layer removed. The resulting product was a blue resinous material which was soluble in hydrocarbon solvents but insoluble in lower alcohols and ketones. The product softened in boiling water.

Other means of purification may also be employed. For example, the benzene solution of the polymer may be washed with aqueous hydrochloric acid to remove the aluminum chloride and the resin precipitated with any low boiling alcohol. The resin may be purified by propane extraction, clay filtration and similar processes. Modifying agents, such as styrene, butadiene and similar polymerizable olefines may be used. These resins are excellent dye materials giving a fluorescent color. They may be also used as plasticizers for chlorinated rubber or as oil thickeners. These resins are compatible with materials such as hydrocarbon oils, resins and may be milled with rubber or other plastic materials.

The above invention is not to be limited by any theory or method of operation but only by the following claims in which it is desired to claim all novelty in so far as the prior art permits.

We claim:
1. Process for producing an improved resinous material comprising condensing a 2-alkyl-3-halo-propene with an aromatic hydrocarbon by heating in the presence of catalyst of the type of aluminum chloride.

2. Process in accordance with claim 1 in which said 2-alkyl-3-halo-propene is 2-methyl-3-chlorpropene and said aromatic material is benzene.

3. An improved resinous material comprising a condensation product of an aromatic compound of the formula RX, where R is an aromatic hydrocarbon radical and X is a member of the class consisting of hydrogen and alkyl and hydroxyl groups, and a compound of the formula:

where X' is a halogen and R' is a member of the class consisting of alkyl radicals, aryl radicals and aryl radicals containing alkyl groups.

4. Process for producing an improved resinous material which comprises condensing an aromatic compound of the formula RX, where R is an aromatic hydrocarbon radical and X is a member of the class consisting of hydrogen and alkyl and hydroxyl groups, with a compound of the formula:

where X' is a halogen and R' is a member of the class consisting of alkyl radicals, aryl radicals and aryl radicals containing alkyl groups, in the presence of a catalyst of the type of aluminum chloride.

5. Process according to claim 4 in which the condensation takes place at a temperature of about 176° F. in the presence of aluminum chloride as the catalyst.

6. An improved resinous material comprising a condensation product of 2-methyl-3-chlorpropene with benzene.

7. An improved resinous material comprising a condensation product of a 2-alkyl-3-chlorpropene, wherein the alkyl group contains 1 to 6 carbon atoms, with an aromatic hydrocarbon.

8. An improved resinous material comprising a condensation product of 2-phenyl-3-chlorpropene with benzene.

9. An improved resinous material comprising a condensation product of 2-methyl-3-chlorpropene with naphthalene.

WARREN M. SMITH.
WILLIAM J. SPARKS.